United States Patent
Willcock et al.

(10) Patent No.: US 11,886,806 B2
(45) Date of Patent: *Jan. 30, 2024

(54) TEMPLATING PROCESS FOR A MULTI-PAGE FORMATTED DOCUMENT

(71) Applicant: Certinia Inc., San Jose, CA (US)

(72) Inventors: Stephen Paul Willcock, Harrogate (GB); Bradley West Slater, Leeds (GB)

(73) Assignee: Certinia Inc., San Jose, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/513,435

(22) Filed: Oct. 28, 2021

(65) Prior Publication Data

US 2022/0164527 A1    May 26, 2022

Related U.S. Application Data

(63) Continuation of application No. 16/696,782, filed on Nov. 26, 2019, now Pat. No. 11,210,460, which is a continuation of application No. 15/271,875, filed on Sep. 21, 2016, now Pat. No. 10,496,741.

(51) Int. Cl.
*G06F 40/186* (2020.01)
*G06F 40/106* (2020.01)
*G06F 40/177* (2020.01)

(52) U.S. Cl.
CPC .......... *G06F 40/186* (2020.01); *G06F 40/106* (2020.01); *G06F 40/177* (2020.01)

(58) Field of Classification Search
None
See application file for complete search history.

(56) References Cited

U.S. PATENT DOCUMENTS

| | | |
|---|---|---|
| 5,673,390 A | 9/1997 | Mueller |
| 5,787,432 A | 7/1998 | Letourneau |
| 6,425,017 B1 | 7/2002 | Dievendorff et al. |
| 6,449,643 B1 | 9/2002 | Hyndman et al. |
| 6,839,356 B2 | 1/2005 | Barany et al. |

(Continued)

FOREIGN PATENT DOCUMENTS

WO    2013179383 A1    12/2013

OTHER PUBLICATIONS

Abstract vs. Concrete Syntax Trees by Eli Bendersky, published Feb. 16, 2009, https://elithegreenplace.net/2009/02/16/abstract-vs-concrete-syntax-trees (Year: 2009).

(Continued)

*Primary Examiner* — Ariel Mercado
(74) *Attorney, Agent, or Firm* — Carr & Ferrell LLP

(57) ABSTRACT

The disclosed embodiments include a method performed by computer system. The method can include retrieving a layout object including layout information, receiving an indication of a request for a formatted document, and determining that the formatted document should have multiple pages with a common layout feature. The method can further include dynamically generating a template for the formatted document based on the layout information of the layout object and generating the formatted document by using the template to create the multiple pages of the formatted document with the common layout feature.

20 Claims, 5 Drawing Sheets

(56) References Cited

U.S. PATENT DOCUMENTS

| | | | |
|---|---|---|---|
| 7,325,109 B1 | 1/2008 | Muppalaneni et al. | |
| 7,809,376 B2 | 10/2010 | Letourneau et al. | |
| 8,032,860 B2 | 10/2011 | Pichler et al. | |
| 8,122,367 B2 | 2/2012 | Krieger et al. | |
| 8,156,083 B2 | 4/2012 | Banerjee et al. | |
| 8,195,770 B1 | 6/2012 | Aral et al. | |
| 8,359,015 B2 | 1/2013 | Swaminathan et al. | |
| 8,438,654 B1 | 5/2013 | Eicken et al. | |
| 8,543,118 B1 | 9/2013 | Mangal et al. | |
| 8,892,446 B2 | 11/2014 | Cheyer et al. | |
| 8,964,298 B2 | 2/2015 | Haddick et al. | |
| 9,185,719 B2 | 11/2015 | Wietfeldt et al. | |
| 9,189,753 B2 | 11/2015 | Morley et al. | |
| 9,213,893 B2 * | 12/2015 | Laaser | G06V 30/40 |
| 9,501,585 B1 | 11/2016 | Gautam et al. | |
| 9,817,439 B2 | 11/2017 | Gosieski, Jr. et al. | |
| 9,900,302 B2 | 2/2018 | Wood | |
| 10,073,824 B1 * | 9/2018 | Krappe | G06F 40/18 |
| 10,110,716 B2 | 10/2018 | Lim et al. | |
| 10,152,499 B1 | 12/2018 | Wilton | |
| 10,303,675 B2 | 5/2019 | Fawcett et al. | |
| 10,348,716 B2 | 7/2019 | Wood | |
| 10,372,811 B2 * | 8/2019 | Rashid | G06F 40/186 |
| 10,423,396 B1 | 9/2019 | Yang | |
| 10,496,741 B2 | 12/2019 | Willcock et al. | |
| 10,558,757 B2 | 2/2020 | Fan et al. | |
| 10,671,428 B2 | 6/2020 | Zeitlin | |
| 10,776,355 B1 | 9/2020 | Batsakis et al. | |
| 10,846,471 B2 | 11/2020 | Brown et al. | |
| 10,846,481 B2 | 11/2020 | Willcock et al. | |
| 10,853,455 B2 | 12/2020 | Foster et al. | |
| 10,922,485 B2 | 2/2021 | Corfield et al. | |
| 11,038,689 B2 | 6/2021 | Bres | |
| 11,210,460 B2 | 12/2021 | Willcock et al. | |
| 11,238,218 B2 | 2/2022 | Corfield et al. | |
| 11,265,304 B2 | 3/2022 | Wood | |
| 11,347,938 B2 | 5/2022 | Brown et al. | |
| 11,373,046 B2 | 6/2022 | Willcock et al. | |
| 2003/0033278 A1 | 2/2003 | Abe et al. | |
| 2004/0102956 A1 | 5/2004 | Levin | |
| 2004/0205726 A1 | 10/2004 | Chedgey et al. | |
| 2004/0243794 A1 | 12/2004 | Mackin et al. | |
| 2004/0255233 A1 | 12/2004 | Croney et al. | |
| 2005/0094206 A1 | 5/2005 | Tonisson | |
| 2005/0246632 A1 | 11/2005 | Guido et al. | |
| 2006/0190452 A1 | 8/2006 | Ellis et al. | |
| 2006/0190487 A1 | 8/2006 | Hicks et al. | |
| 2007/0089053 A1 | 4/2007 | Uhlig et al. | |
| 2008/0147627 A1 | 6/2008 | Natkovich et al. | |
| 2008/0282175 A1 | 11/2008 | Costin et al. | |
| 2008/0306981 A1 | 12/2008 | Jiang et al. | |
| 2009/0006146 A1 | 1/2009 | Chowdhary et al. | |
| 2009/0037933 A1 | 2/2009 | Chandran et al. | |
| 2009/0125888 A1 | 5/2009 | Ahe et al. | |
| 2009/0204386 A1 | 8/2009 | Seligman et al. | |
| 2009/0248393 A1 | 10/2009 | Tomko et al. | |
| 2009/0265531 A1 | 10/2009 | Hu et al. | |
| 2009/0281789 A1 | 11/2009 | Waibel et al. | |
| 2009/0319499 A1 | 12/2009 | Meijer et al. | |
| 2011/0016180 A1 | 1/2011 | Bharadhwaj et al. | |
| 2011/0078297 A1 | 3/2011 | Tamura | |
| 2011/0197124 A1 | 8/2011 | Garaventa | |
| 2011/0213766 A1 | 9/2011 | Hong et al. | |
| 2011/0265066 A1 | 10/2011 | Fee et al. | |
| 2011/0276945 A1 | 11/2011 | Chasman et al. | |
| 2011/0307948 A1 | 12/2011 | Ranjan et al. | |
| 2012/0084609 A1 | 4/2012 | Tkachuk et al. | |
| 2012/0131445 A1 | 5/2012 | Oyarzabal et al. | |
| 2012/0198279 A1 | 8/2012 | Schroeder | |
| 2012/0271857 A1 | 10/2012 | Chasman et al. | |
| 2012/0304051 A1 | 11/2012 | Balakrishnan et al. | |
| 2013/0042115 A1 | 2/2013 | Sweet et al. | |
| 2013/0139162 A1 | 5/2013 | Jackson | |
| 2013/0145259 A1 | 6/2013 | Kiefer, III et al. | |
| 2013/0159840 A1 | 6/2013 | Nicolaescu | |
| 2013/0205199 A1 * | 8/2013 | Damera-Venkata | G06F 40/106 715/243 |
| 2013/0226562 A1 | 8/2013 | Arnon | |
| 2013/0298012 A1 * | 11/2013 | Slatter | G06F 40/186 715/243 |
| 2014/0053160 A1 | 2/2014 | Fee et al. | |
| 2014/0279977 A1 | 9/2014 | Milousheff et al. | |
| 2014/0282968 A1 | 9/2014 | Aboughanaima et al. | |
| 2014/0344435 A1 | 11/2014 | Mortimore, Jr. et al. | |
| 2015/0026075 A1 | 1/2015 | Mondri et al. | |
| 2015/0046791 A1 * | 2/2015 | Isaacson | G06F 40/146 715/234 |
| 2015/0142846 A1 | 5/2015 | Levine et al. | |
| 2015/0143485 A1 | 5/2015 | Tamura | |
| 2015/0149884 A1 | 5/2015 | Wagner et al. | |
| 2015/0149893 A1 | 5/2015 | Lukic et al. | |
| 2015/0186929 A1 | 7/2015 | Thies et al. | |
| 2015/0293764 A1 | 10/2015 | Visvanathan | |
| 2015/0331701 A1 | 11/2015 | Man et al. | |
| 2016/0069703 A1 | 3/2016 | Nakano et al. | |
| 2016/0173411 A1 | 6/2016 | Son et al. | |
| 2016/0239509 A1 | 8/2016 | Ahuja et al. | |
| 2016/0294667 A1 | 10/2016 | Prabhakar et al. | |
| 2016/0299982 A1 | 10/2016 | Bhave et al. | |
| 2016/0301732 A1 | 10/2016 | Moretto et al. | |
| 2016/0350084 A1 | 12/2016 | Waggoner et al. | |
| 2016/0378450 A1 | 12/2016 | Fu et al. | |
| 2017/0264619 A1 | 9/2017 | Narayanaswamy et al. | |
| 2017/0272550 A1 | 9/2017 | Rodriguez | |
| 2017/0337233 A1 | 11/2017 | Fawcett et al. | |
| 2017/0372246 A1 | 12/2017 | Storey | |
| 2017/0374050 A1 | 12/2017 | Wood | |
| 2018/0081868 A1 | 3/2018 | Willcock et al. | |
| 2018/0102013 A1 | 4/2018 | Spanos et al. | |
| 2018/0139197 A1 | 5/2018 | Woods | |
| 2018/0157479 A1 | 6/2018 | Zhou et al. | |
| 2018/0211213 A1 | 7/2018 | Vivier | |
| 2018/0321918 A1 | 11/2018 | Mcclory et al. | |
| 2019/0079959 A1 | 3/2019 | Ramaiyer | |
| 2019/0179729 A1 | 6/2019 | Roskowski | |
| 2019/0182029 A1 | 6/2019 | Yim et al. | |
| 2019/0272266 A1 | 9/2019 | Fawcett et al. | |
| 2019/0273616 A1 | 9/2019 | Bres | |
| 2019/0288994 A1 | 9/2019 | Wood | |
| 2020/0004824 A1 | 1/2020 | Willcock et al. | |
| 2020/0012717 A1 | 1/2020 | Brown et al. | |
| 2020/0067697 A1 | 2/2020 | Puddu et al. | |
| 2020/0089760 A1 | 3/2020 | Ericson et al. | |
| 2020/0097389 A1 | 3/2020 | Smith et al. | |
| 2020/0097537 A1 | 3/2020 | Willcock et al. | |
| 2020/0218634 A1 | 7/2020 | Jones et al. | |
| 2021/0011972 A1 | 1/2021 | Corfield et al. | |
| 2021/0089714 A1 | 3/2021 | Brown et al. | |
| 2021/0141495 A1 | 5/2021 | Willcock et al. | |
| 2021/0141836 A1 | 5/2021 | Byrne | |
| 2021/0200946 A1 | 7/2021 | Corfield et al. | |
| 2021/0224713 A1 | 7/2021 | Storey | |
| 2021/0326321 A1 | 10/2021 | Fawcett et al. | |
| 2021/0336794 A1 | 10/2021 | Bres | |

OTHER PUBLICATIONS

Cortes, Howard, Non-Final Office Action dated Aug. 3, 2021 for U.S. Appl. No. 17/139,981.

Cortes, Howard, Non-Final Office Action dated Sep. 18, 2020 for U.S. Appl. No. 16/507,561.

Cortes, Howard, Notice of Allowance and Fee(s) Due dated Dec. 15, 2020 for U.S. Appl. No. 16/507,561.

Cortes, Howard, Notice of Allowance and Fee(s) Due dated Sep. 20, 2021 for U.S. Appl. No. 17/139,981.

Example: How to Use Objects in Apex, published Jan. 15, 2015 by SFDC99.com, https://www.sfdc99.com/2015/01/15/example-how-to-use-objects-in-apex/ (Year: 2015).

Force.com Apex Code Developer's Guide, Salesforce, Published Dec. 17, 2015, all pages. (Year: 2015), 2505 pages.

(56) References Cited

OTHER PUBLICATIONS

Hive vs. Hbase, Different Technologies that work Better Together, dezyre webpages, Dec. 7, 2016, https://www.dezyre.com/article/hive-vs-hbase-different-technologies-that-work-better-together/322 (Year: 2016).
Ho, Thomas, Non-Final Office Action dated Oct. 17, 2018 for U.S. Appl. No. 15/869,451.
Ho, Thomas, Notice of Allowance and Fee(s) Due dated Mar. 4, 2019 for U.S. Appl. No. 15/869,451.
Ho, Thomas, Notice of Allowance and Fee(s) Due dated Oct. 18, 2017 for U.S. Appl. No. 15/189,218.
Hoang, Son T., Applicant-Initiated Interview Summary dated Oct. 10, 2018 for U.S. Appl. No. 15/161,142.
Hoang, Son T., Non-Final Office Action dated May 23, 2018 for U.S. Appl. No. 15/161,142.
Hoang, Son T., Non-Final Office Action dated Sep. 30, 2020 for U.S. Appl. No. 16/418,928.
Hoang, Son T., Notice of Allowance and Fee(s) Due dated Feb. 26, 2021 for U.S. Appl. No. 16/418,928.
Hoang, Son T., Notice of Allowance and Fee(s) Due dated Feb. 8, 2019 for U.S. Appl. No. 15/161,142.
Hutton, Nan, Final Office Action dated Dec. 7, 2021 for U.S. Appl. No. 16/532,669.
Hutton, Nan, Non-Final Office Action dated Jul. 26, 2021 for U.S. Appl. No. 16/532,669.
Hutton, Nan, Notice of Allowance and Fee(s) Due dated May 18, 2022 for U.S. Appl. No. 16/532,669.
Jacob, Ajith, Non-Final Office Action dated Feb. 15, 2022 for U.S. Appl. No. 16/681,502.
Jones, William B., Applicant-Initiated Interview Summary dated Nov. 25, 2020 for U.S. Appl. No. 15/909,101.
Jones, William B., Final Office Action dated Jul. 30, 2020 for U.S. Appl. No. 15/909,101.
Jones, William B., Non-Final Office Action dated Dec. 20, 2019 for U.S. Appl. No. 15/909,101.
Jones, William B., Non-Final Office Action dated Mar. 14, 2020 for U.S. Appl. No. 15/909,101.
Jones, William B., Notice of Allowance and Fee(s) Due dated Feb. 8, 2021 for U.S. Appl. No. 15/909,101.
Language Server Protocol, Wikipedia, published Nov. 8, 2018, https://en.wikipedia.org/w/index.pho?title=Lanugage_Server_Protocol&oldid=867837725 (Year: 2018).
Magical External Objects: Seamless Integration is Here, Salesforce, video published Nov. 17, 2014, retrieved from URL: https://www.youtube.com/watch?v=GGvCcuTbhZE.
Malinowski et al., "A Conceptual Solution for Representing Time in Data Warehouse Dimensions," Proceedings of the 3rd Asia-Pacific Conference on Conceptual Modeling (APCCM2006), Hobart, Australia, Research and Practice in Information Technology, vol. 53 (Year: 2006).
MapReduce, Wikipedia, Archives.org, Jun. 16, 2016, https://web.archive.org/web/20160616175158/https://en.wikipedia.org/wiki/MapReduce (Year: 2016).
Mcfadden, Susan Iris, Non-Final Office action dated Nov. 30, 2021 for U.S. Appl. No. 17/037,641.
Mcfadden, Susan Iris, Notice of Allowance and Fee(s) Due dated Jul. 17, 2020 for U.S. Appl. No. 16/256,069.
Mcfadden, Susan Iris, Notice of Allowance and Fee(s) Due dated Feb. 25, 2022 for U.S. Appl. No. 17/037,641.
Meky, Moustafa M., Non-Final Office Action dated Sep. 2, 2021 for U.S. Appl. No. 16/432,086.
MultiThreading with the Actor Model by CoastRD.com, historical version published Apr. 13, 2014, https://web.archive.org/web/20140413175210/http://www.coastrd.com/multithreading-with-the-actor-model (Year: 2014).
Nguyen et al., "An approach towards an event-fed solution for slowly changing dimensions in data warehouses with a detailed case study," Data & Knowledge Engineering 63, pp. 26-43 (Year: 2007).
Rotaru, Octavian, Final Office Action dated Apr. 6, 2020 for U.S. Appl. No. 15/190,178.
Rotaru, Octavian, Final Office Action dated Jul. 8, 2019 for U.S. Appl. No. 15/190,178.
Rotaru, Octavian, Final Office Action dated May 11, 2022 for U.S. Appl. No. 17/163,283.
Rotaru, Octavian, Non-Final Office Action dated Dec. 9, 2021 for U.S. Appl. No. 17/163,283.
Rotaru, Octavian, Non-Final Office Action dated Mar. 8, 2019 for U.S. Appl. No. 15/190,178.
Rotaru, Octavian, Non-Final Office Action dated Nov. 22, 2019 for U.S. Appl. No. 15/190,178.
Rotaru, Octavian, Notice of Allowance and Fee(s) Due dated Dec. 21, 2020 for U.S. Appl. No. 15/190,178.
Schell, Joseph O., Corrected Notice of Allowability dated Aug. 26, 2021 for U.S. Appl. No. 16/242,913.
Schell, Joseph O., Final Office Action dated Mar. 25, 2021 for U.S. Appl. No. 16/242,913.
Schell, Joseph O., Notice of Allowance and Fee(s) Due dated Aug. 6, 2021 for U.S. Appl. No. 16/242,913.
Tzeng, Feng-Tzer, Non-Final Office Action dated Mar. 19, 2020 for U.S. Appl. No. 16/027,207.
Tzeng, Feng-Tzer, Non-Final Office Action dated Oct. 1, 2021 for U.S. Appl. No. 17/039,852.
Tzeng, Feng-Tzer, Notice of Allowance and Fee(s) Due dated Feb. 3, 2022 for U.S. Appl. No. 17/039,852.
Tzeng, Feng-Tzer, Notice of Allowance and Fee(s) Due dated Jul. 22, 2020 for U.S. Appl. No. 16/027,207.
U.S. Appl. No. 62/692,587, filed Jun. 29, 2018.
Vanek et al., Static Analysis of Program Source Code Using EDSA, Proceedings, Conference on Software Maintenance, 8 pages. (Year: 1989).
What is batch processing in hadoop, Quora webpages, May 29, 2016, https://www.quora.com/What-is-batch-pricessing-in-hadoop (Year: 2016).
Wood, Michael D., Notice of Allowance and Fee(s) Due dated Oct. 22, 2021 for U.S. Appl. No. 16/432,086.
Mercado Vargas, Ariel, Non-Final Office Action dated Aug. 3, 2018 for U.S. Appl. No. 15/271,875.
Mercado Vargas, Ariel, Non-Final Office Action dated Jul. 6, 2020 for U.S. Appl. No. 16/696,782.
Mercado Vargas, Ariel, Non-Final Office Action dated Jun. 2, 2021 for U.S. Appl. No. 16/696,782.
Mercado Vargas, Ariel, Notice of Allowance and Fee(s) Due dated Aug. 21, 2019 for U.S. Appl. No. 15/271,875.
Vargas, Ariel Mercado, Notice of Allowance and Fee(s) Due dated Aug. 20, 2021 for U.S. Appl. No. 16/696,782.

\* cited by examiner

TEMPLATING PROCESS FOR A MULTI-PAGE FORMATTED DOCUMENT

CROSS-REFERENCE TO RELATED APPLICATIONS

This nonprovisional patent application is a continuation application of U.S. patent application Ser. No. 16/696,782, filed Nov. 26, 2019, now U.S. Pat. No. 11,210,460, and entitled, "TEMPLATING PROCESS FOR A MULTI-PAGE FORMATTED DOCUMENT," U.S. patent application Ser. No. 16/696,782 is a continuation application of U.S. patent application Ser. No. 15/271,875, filed Sep. 21, 2016, now U.S. Pat. No. 10,496,741 and entitled, "DYNAMIC INTERMEDIATE TEMPLATES FOR RICHLY FORMATTED OUTPUT," each of which are herein incorporated by reference in their entirety for all purposes.

FIELD

The disclosed teachings generally relate to data processing. The disclosed teachings more particularly to using dynamic intermediate templates for generating richly formatted output based on records in a cloud platform, such as the SALESFORCE platform.

BACKGROUND

Cloud platforms such as the salesforce (a trademark of Salesforce.com, Inc.) platform allow for sharing processing resources and data in a multi-tenant network that offers computing services on demand to customers. More generally, cloud computing enables ubiquitous, on-demand access to a shared pool of configurable computing resources (e.g., networks, servers, storage, applications, and services), which can be rapidly provisioned and released with minimal management effort. For example, the salesforce platform can provide numerous companies with an environment to deploy applications that provide interfaces for case management and task management, and a system for automatically handling events.

The SALESFORCE platform can facilitate processing millions, hundreds of millions, or even billions of records while optimizing the performance of data loads and integration into a company's services. However, cloud-based platforms that provide multi-tenant processing impose limits in an effort to uniformly distribute access to resources, which create an ever present issue for customers that work with large volumes of data. The SALESFORCE platform imposes limits that create an issue for customers seeking to process large volumes of data in a reasonable period of time. For example, the SALESFORCE platform can limit processing time for an output rendering process in a synchronous CPU (central processing unit) context. If an output cannot be rendered within the time limit, the output rendering process will fail.

SUMMARY

Introduced here is a technique including at least one computer-implemented method and at least one system for generating a formatted output document using a dynamic templating process. The computer-implemented method can be performed in, e.g., a SALESFORCE application development platform. The method can include retrieving a layout object including layout information via a user interface, extracting the layout information from the layout object, receiving a user request for the formatted output document, dynamically generating a template for the formatted output document based on the layout information extracted from the layout object, generating the formatted output document by inserting data into the template, and outputting the formatted output document in response to the user request.

In some embodiments, a computer-implement method performed by a cloud-based platform includes retrieving a layout object including layout information via a user interface, extracting the layout information from the layout object, in response to a user request for the formatted output document, dynamically generating a template for the formatted output document based on the layout information extracted from the layout object, the template including a table that has a single table row, expanding the table including the single table row into a table including a plurality of table rows based on a tabular dataset to be inserted, generating the formatted output document by inserting data including the tabular dataset into the template, and outputting the formatted output document in response to the user request.

The computer system can utilize, e.g., a SALESFORCE application development platform. The computer includes a processor and a memory. The memory includes instructions which, when executed by the processor, can cause the computer system to retrieve a layout object including layout information via a user interface and extract the layout information from the layout object, dynamically generate a template for the formatted output document based on the layout information extracted from the layout object in response to a user request for a formatted output document, and generate the formatted output document by inserting data into the template and output the formatted output document.

Other aspects of the disclosed embodiments will be apparent from the accompanying figures and detailed description.

This Summary is provided to introduce a selection of concepts in a simplified form that are further explained in the Detailed Description. This Summary is not intended to identify key features or essential features of the claimed subject matter, nor is it intended to be used to limit the scope of the claimed subject matter.

BRIEF DESCRIPTION OF THE DRAWINGS

Various embodiments or examples ("examples") are disclosed in the following detailed description and the accompanying drawings.

DETAILED DESCRIPTION

Figure 1:
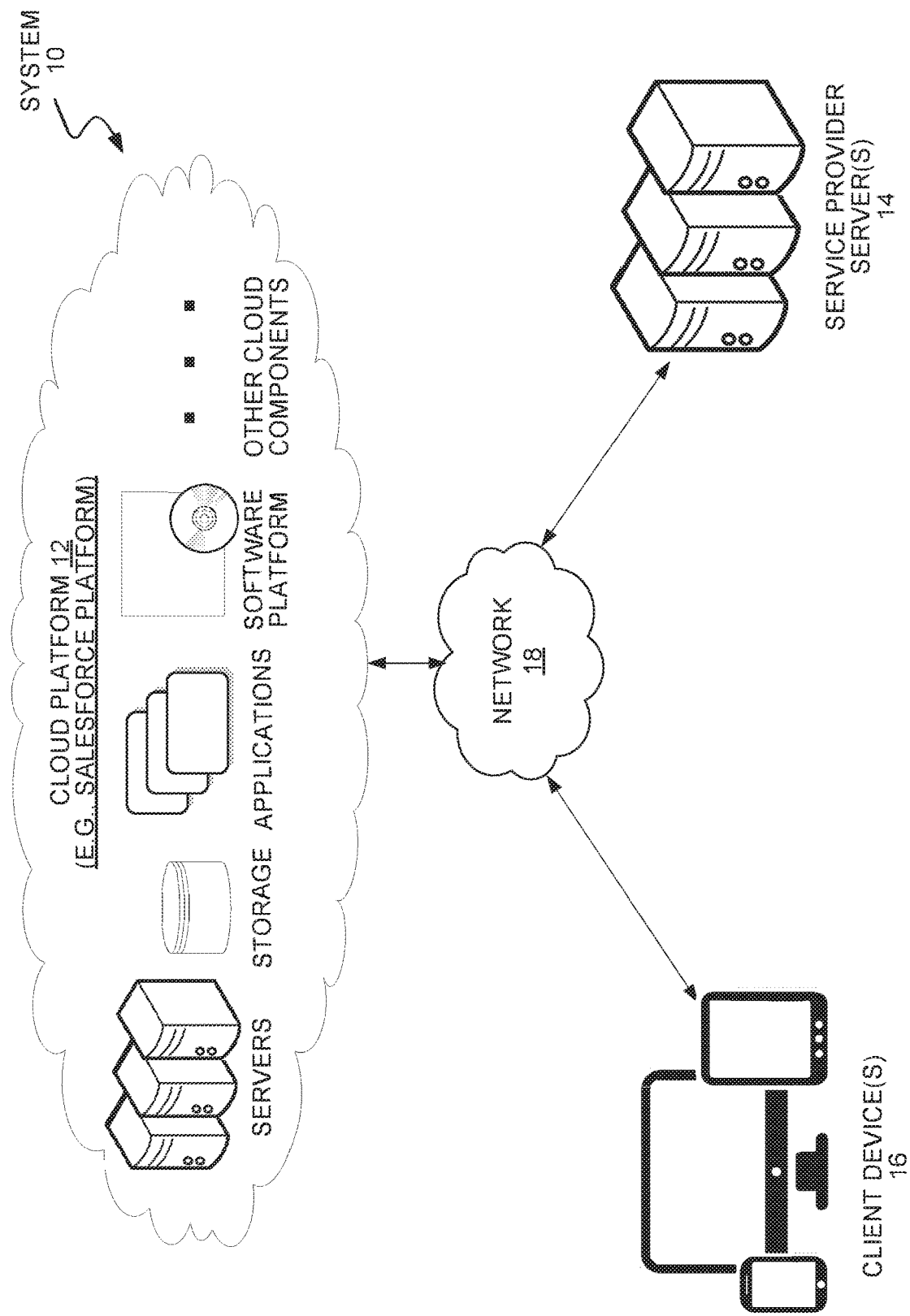
FIG. 1 is a block diagram of a cloud-based system that provides a dynamic templating solution for generating richly formatted output in a flexible and scalable manner, according to some embodiments of the present disclosure.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Processing large volumes of data requires a complex scalable computing infrastructure that is cost-prohibitive to many businesses. As such, businesses turn to cloud computing to use a shared pool of configurable computing resources that provide scalable services for many of these applications. Cloud-based applications are accessible through a portal (e.g., website) connected to a cloud infrastructure over a network. An example of a cloud-based platform includes the Salesforce platform.

Manipulation of even moderately large data sets on a cloud-based platform can be difficult due to constraints imposed on users to manage multiple users accessing the same cloud-based platform. For example, a cloud-based platform can limit processing time for an output rendering process in a synchronous CPU context. If an output cannot be rendered within the time limit, the output rendering process will fail. These constraints limit the utility of cloud-based platforms to process large volumes of data, which is required by, for example, applications for payroll, billing, customer relationship management, and the like. Particularly, a process for creating a formatted output for those applications can be expensive in terms of CPU time and can be difficult to scale. The rendering process can fail if the process requires a CPU time that exceeds the time limited for a synchronous CPU context, imposed by the cloud-based platform.

The disclosed embodiments include at least one technique that provides a dynamic templating solution for generating richly formatted output (e.g., reports in HTML, also referred to as HyperText Markup Language). Such a dynamic templating solution is more flexible than conventional methods and is easy to scale. The disclosed technique uses intermediate templates to alleviate some of the processing time that is required by conventional methods. Before fetching and processing the data to be presented in the output, the disclosed technique has already defined the layout of the output. Based on the already defined layout, the disclosed technique can pre-process intermediate templates (e.g., based on HTML).

The disclosed technique provides a dynamic templating solution on a cloud-based platform (e.g., SALESFORCE platform) using, e.g., APEX, which is a proprietary JAVA-like programming language (e.g., class-based, object-oriented) for FORCE.COM (a platform as a service for SALESFORCE platform). The dynamic templating solution using APEX is more flexible and scalable than static templates that are written in VISUALFORCE, which is an XML syntax typically used to generate component-based user interface based on tag-based markup language (e.g., HTML). The dynamic template is pre-rendered to contain tokens in places where data will be inserted. If the template has tables, the disclosed technique can render a table row that is wrapped in one or more tokens. The table row can be repeated (by, e.g., creating a new template) by an intermediate service a number of times required based on the layout of the data output.

The dynamic templating process provides users an easy way to modify the data layout of the formatted output document. Conventional static templates are written using computer language (e.g., VISUALFORCE). A user may need to hire an expert or a consultant with expert knowledge of VISUALFORCE to change the layout of the report. In contrast, with the dynamic templating process, a customer can easily change the data layout by modifying layout objects via a graphic user interface. When a user requests to run a report, the cloud platform can generate a dynamic template based on the layout data extracted from the layout objects on the fly. Then a formatted report document is generated by inserting data into the dynamic template.

Furthermore, a dynamic template can be rendered in the backend across multiple asynchronous CPU contexts. Rendering of the dynamic template thus can use more CPU time, and as such, can handle larger data volumes than a conventional static template.

An example of a specific application that could benefit from the disclosed embodiments includes, e.g., subscription billing services, which typically require processing large volumes of records. However, the disclosed architecture has broad applicability to scale processing in the salesforce platform or any similar cloud-based service to process large volumes of data to generate a richly formatted output.

FIG. 1 is a block diagram of a cloud-based system 10 that provides a dynamic templating solution for generating richly formatted output in a flexible and scalable manner, according to some embodiments of the present disclosure. The system 10 includes components such as a cloud platform 12 (e.g., the salesforce platform), one or more service provider servers 14 that use cloud-based services to provide add-on applications, and one or more client devices 16 that use the add-on applications, all of which are interconnected over a network 18, such as the Internet, to provide parallel processing of a large volume of data.

The network 18 may include any combination of private, public, wired, or wireless portions. Data communicated over the network 18 may be encrypted or unencrypted at various locations or along different portions of the network 18. Each component of the system 10 may include combinations of hardware and/or software to process data, perform functions, communicate over the network 18, and the like. For example, any component of the system 10 may include a processor, memory or storage, a network transceiver, a display, an operating system, and application software (e.g., for providing a user portal), and the like. Other components, hardware, and/or software included in the system 10 are well known to persons skilled in the art and, as such, are not shown or discussed herein.

The cloud platform 12 can provide access to a shared pool of configurable computing resources including servers, storage, applications, software platform, networks, services, and the like accessed by the service provider servers 14 to offer add-on applications to client devices 16. The salesforce platform (e.g., the cloud platform 12) supports multiple tenants and is commonly referred to as a platform as a service (PaaS).

The PaaS is provided to developers for creating the add-on applications that run on the components of the cloud platform 12. Force.com is an example of a PaaS that hosts applications hosted on Salesforce.com, which is an example of a cloud platform. For example, add-on applications can provide subscription billing services to users using the client devices 16. The subscription billing services are provided by the service provider servers 14 and include applications built on the software platform of the cloud platform 12.

The service provider servers 14 may include any number of server computers that provide the add-on applications such as subscription billing services, which allow businesses to automatically bill their customers for goods or services on a pre-arranged schedule. The billing services may support installment payments, usage-based billing, multiple charging methods (e.g., tiered or capped). Although shown separately from the cloud platform 12, the service provider servers 14 may be included as part of the cloud platform 12.

The service provider servers 14 may provide or administer a user interface (e.g., website) accessible from the client devices 16. The user interface may include features such as dashboard analytics to provide insight into how a business is performing. Examples of businesses that could benefit from subscription billing services range from SaaS (Software as a Service) providers to energy and utility companies.

The add-on applications provided by the service provider servers 14 are built using a particular programming language. For example, Force.com applications can be built using Apex (a proprietary JAVA-like programming language (e.g., class-based, object-oriented) for Force.com to process data at the backend of the cloud platform) and/or Visualforce (an XML syntax typically used to generate HTML). The code used to build applications may include functions that are accessible by the add-on applications.

The add-on applications process large volumes of data generated by businesses. For example, the service provider servers 14 can provide subscription billing services that process large volumes of billing data generated by businesses that have a large number of customers that are billed routinely for ongoing services. The data may include sales agreements, usage, and pricing, which are used to generate sales invoices to bill customers. As such, voluminous amounts of data are generated continuously.

Referring back to FIG. 1, the client devices 16 (referred to herein collectively as client devices 16 and individually as client device 16) are used by users (e.g., businesses using the subscription billing services) to interact with the system 10. Examples of client devices include computers (e.g., Apple MacBook, Lenovo 440), tablet computers (e.g., Apple iPad, Samsung Note, Amazon Fire, Microsoft Surface), smartphones (e.g., Apple iPhone, Samsung Galaxy, Nokia Lumina), and any other device that is capable of accessing the service provider servers 14 over the network 18.

In an effort to accommodate multiple tenants (e.g., multiple service providers), the cloud platform 12 can impose restriction on the processes so that one or more processes do not monopolize shared resources on the cloud platform 12. For example, if a process built using APEX exceeds an imposed limit, the cloud platform 12 can issue a runtime exception indicating that the process cannot be handled. For example, a process rendering a static VISUALFORCE template needs to perform the entire rendering process in one synchronous CPU context, which has a limit of 10 seconds of processing time. If the static template cannot be rendered within the 10-second time limit, the process fails.

The limit can create problems, especially when the process generates a richly formatted output based on a large data volume and/or complex user defined layout or format. Because of the volume of the data records or the complexity of the output layout, the static templating process may not finish the rendering within the 10-second time limit and therefore can fail. In order to avoid the problems, a process for generating richly formatted output can render a dynamic template in the backend of the cloud platform 12 across multiple asynchronous CPU contexts, which have a limit of 60 second of processing time for each asynchronous CPU context. Such a dynamic templating process can handle much larger data volumes and more complex user-defined layout, than the static templating process.

Figure 2:
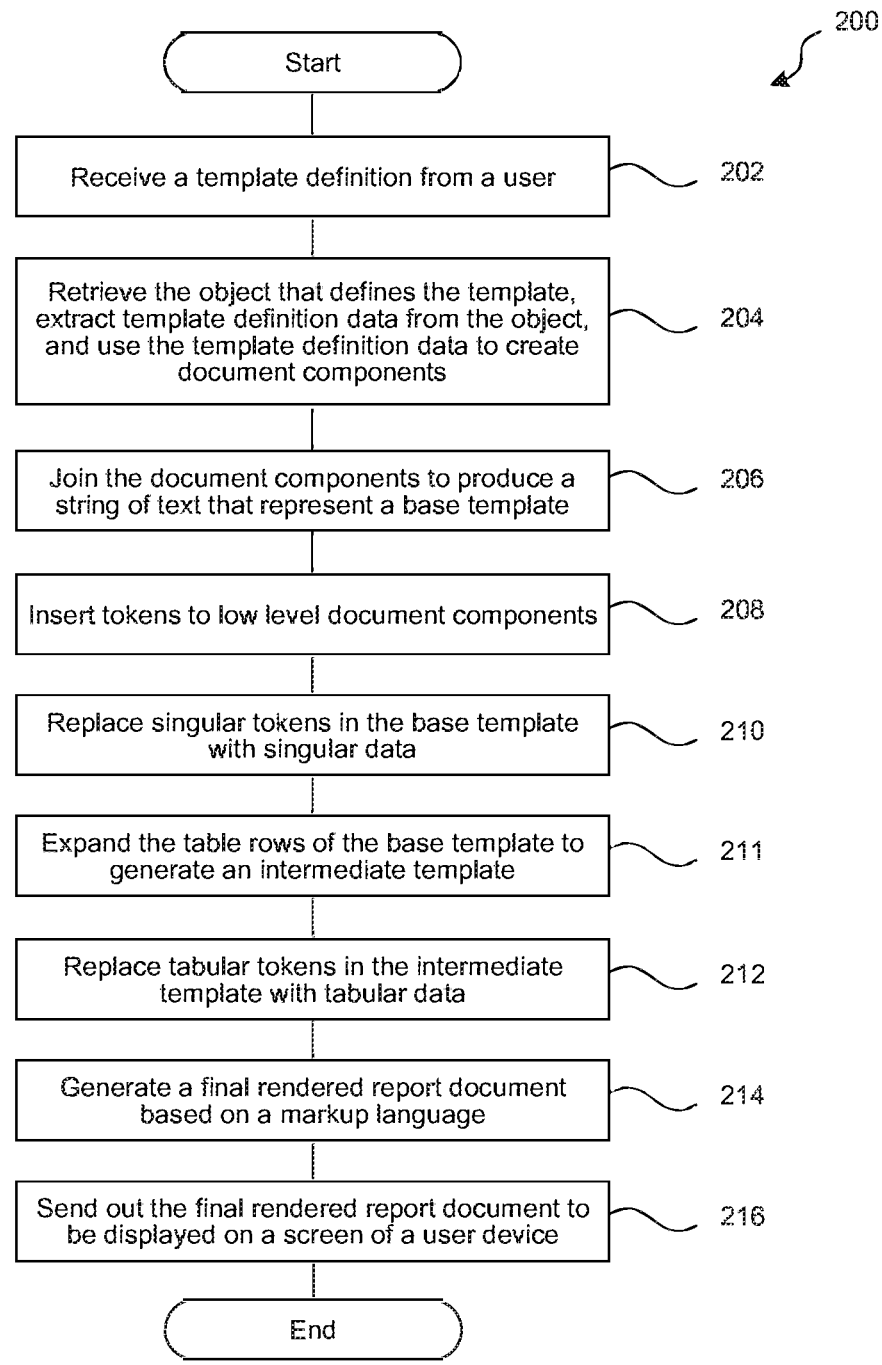
FIG. 2 is a flow chart illustrating an example of a template rendering process for generating formatted output, according to some embodiments of the disclosure.

FIG. 2 illustrates an example 200 of a template rendering process for generating formatted output, according to some embodiments of the disclosure. In step 202, a system (e.g., a cloud platform) receives a template definition from a user. In some embodiments, a user defines the template in one or more layout objects of the cloud platform 12 (e.g., a SALESFORCE object). For example, the user can define the template in a SALESFORCE object that is rendered in memory by a programming language such as APEX. In step 204, a rendering process of the system retrieves the object that defines the template, extracts template definition data from the object, and uses the template definition data to create document components (e.g., HTML, elements). In other words, using the objects, the dynamic template can have an extra layer of metadata that defines the shape of the data to be rendered in the template. In step 206, the rendering process joins the document components to produce a string of text that represents a base template.

The SALESFORCE objects that define the template can be hierarchical. For example, an object containing template definition data can include one or more objects that further define the template or document components of the template (e.g., labels, tables, etc.). In some embodiments, each of the individual object has a text template for one or more document components defined within the rendering process, and the joining of the templates for the document components produces the base template.

In some embodiments, the rendering process can use a previously cached template as the base template. For example, the rendering process can first determine whether a previously cached template exists in the memory. If such a previously cached template exists, the rendering process uses the previously cached template as the base template, instead of generating a base template based on template definition data extracted from objects.

In step 208, the rendering process inserts tokens to low level document components (e.g., labels, tables, titles, etc.) to indicate that data will be inserted into the template at positions of the tokens at a later stage. The tokens are simple links for the data and can contain information regarding the locations where the data are stored. The process can read a token, find data corresponding to the token, and insert data into the template. The tokens are generic, in that the tokens themselves do not contain the values of the data, but include keys identifying the data items.

In some embodiments, each page of the base template can be expanded to cover multiple pages of the final rendered report document. For example, a base template may include three pages: a start page, a middle page, and an end page. The start page may contain titles and descriptions. The middle page may contain data tables. The end page may contain total figures and a summary. A corresponding final rendered report document may include multiple middle pages to cover all data tables. Thus, the middle page may need to repeat itself in the rendering process as long as there are still data tables to be added in the final rendered report document.

One advantage of creating the base template, instead of just concatenating HTML, tags to produce a final document, is that there is no need to create template page for each page of the final document. For example, if a page is to be repeated in the final document (e.g., a middle page including data table), the page in the base template can be just copied (repeated or replicated). In addition, the base template can be built and cached in the platform based on the objects that define the template by the user.

In some embodiments, a user may instruct to generate a second final report document, which contains different document data but contains the same document layout and format as the first final report document. In that case, the base template has already been rendered and cached in the platform. The system can just use the base template again for rendering the second final report document. The cached base template eliminates a need to rebuild the same template from scratch.

In step 210, the rendering process replaces singular tokens in the base template with singular data. Singular tokens are tokens in singular document components such as labels, titles, etc. and not in tabular document component (e.g., HTML table tag). Each token represents a data item to be merged into the template to produce a final report document. Those data items are called singular data or non-tabular data.

In step 211, the rendering process expands the table rows of the base template to generate an intermediate template. In step 212, the rendering process replaces tabular tokens in the intermediate template with tabular data. The details of the steps 210 and 212 are disclosed in FIG. 3.

In step 214, the rendering process generates a final rendered report document based on a markup language (e.g., HTML). In step 216, the platform sends out the final rendered report document to be displayed on a screen of a user device. The final rendered report document is a formatted output. A formatted output is a document object that includes text, tabulated data and/or graphical elements. An example of a formatted output is a web page (in HTML) or a PDF (portable document format) file. The formatted output provides a fine control of layout (e.g., positions and sizes of elements, formats of multiple pages, repeating elements, etc.), fonts and ornamentation of text elements, and positions and sizes of logos and images, etc.

Figure 3:
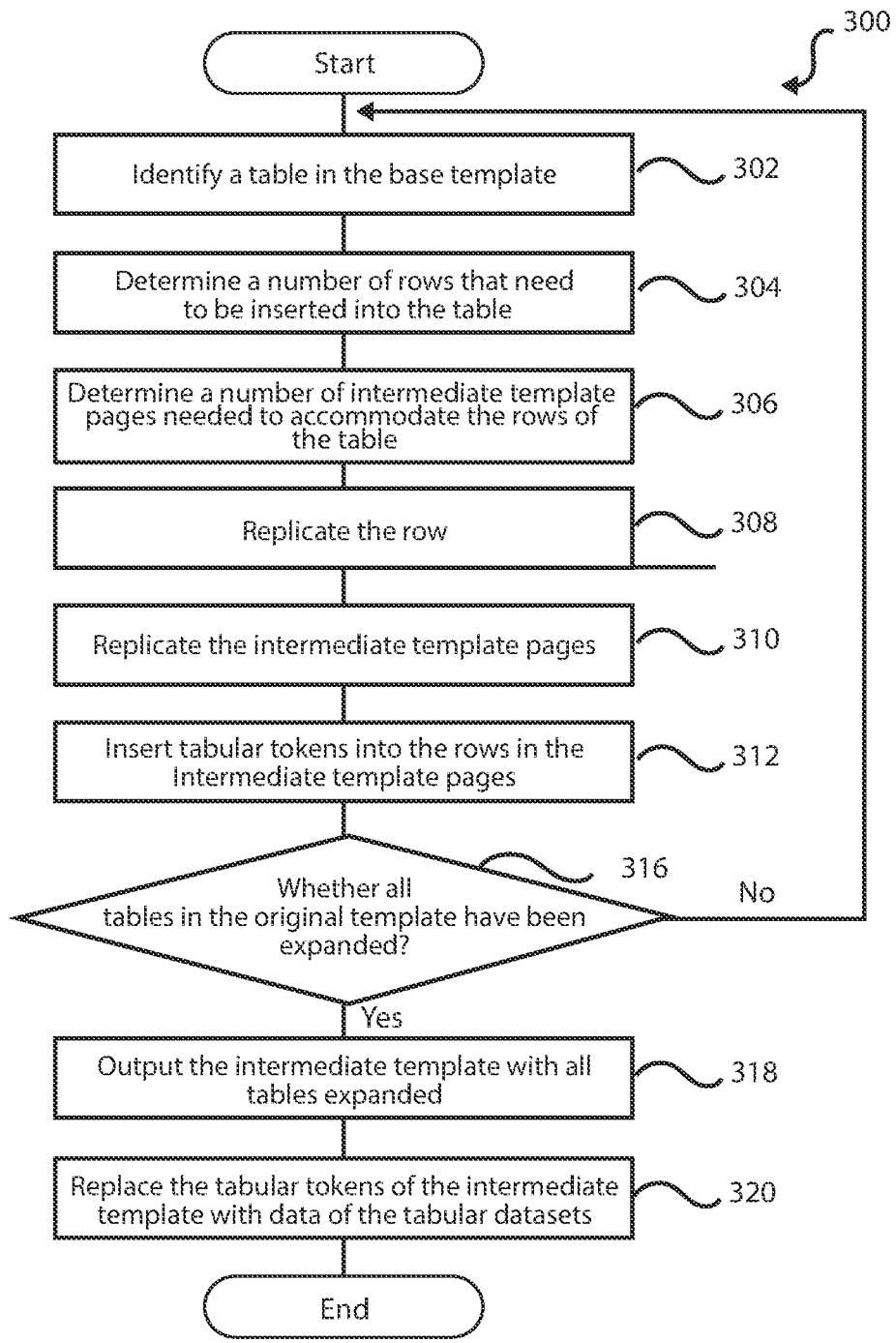
FIG. 3 is a flow chart illustrating an example of a process for generating an intermediate template and inserting tabular data, according to some embodiments of the disclosure.

FIG. 3 illustrates an example of a process for generating an intermediate template and inserting tabular data, according to some embodiments of the disclosure. In step 302, the process 300 identifies a table in the base template. In the base template, each table is represented by a table component (e.g., an HTML, table element) that only contains one table row. In step 304, the process determines a number of rows that need to be inserted into the table from the tabular data set. In step 306, the process determines a number of intermediate template pages needed to accommodate the rows of the table.

For each table, the template may need to include more than one template page to accommodate the table. For example, a tabular dataset to be merged into the template may contain 70 rows of data. On the other hand, each template page of the template can contain a maximum number of 20 rows, based on the format of the table and the page. This means that the template needs at least two types of intermediate template pages: a first type of intermediate template page including 20 rows, and a second type of intermediate template page including 10 rows.

In step 308, the process takes the single row of the table in the base template and replicates the row for a number of times based on the number of rows of the intermediate template page. Using the example discussed above, the first type of intermediate template page needs 20 rows, and the second type of intermediate template page needs 10 rows.

In step 310, the process replicates the intermediate template pages if necessary. Using the example discussed above, the process copies the first type of intermediate template page (with 20 rows) three times. As a result, the template now includes 3 intermediate template pages of the first type (with 20 rows for each page) and 1 intermediate template page of the second type (with 10 rows for each page). In total, the four intermediate template pages can contain the 70 rows of the tabular dataset.

In step 312, the process inserts tabular tokens into the rows in the intermediate template pages. Additionally, the process replaces the original base template page with the intermediate template pages.

In step 316, the process determines whether all tables in the original template have been expanded. If not, the process goes back to step 302 to identify another table in the original base template for expansion. Otherwise, the process proceeds to step 318. In step 318, the process outputs the intermediate template with all table expanded. In step 320, the process replaces the tabular tokens of the intermediate template with data of the tabular datasets.

One advantage of the process 300 is that the system does not need to insert each row individually into the base template for each of the row of the tabular dataset. In the base template, only one row is rendered for each table in the base template. Since each row of a table has the same format or layout, the system can generate the row in the template once and then repeats the row with the same format or layout. In other words, the system uses the properties of the defined template (e.g., the maximum number of allowed table rows per page), to determine the layout and number of intermediate template pages needed. Then the system generates the intermediate template pages, replicates the pages if necessary, and merges the data of the tabular datasets into the template.

The dynamic templating process illustrated in FIGS. 2 and 3 are advantageous when compared to conventional static templates. Static templates are written in languages such as VISUALFORCE and shipped with an application. In order to modify the format (e.g., positioning, font, column order, styling, totals, etc.) of the data rendered by a static template, the code of the static template needs to be edited by an expert user who understands the language (e.g., VISUALFORCE). That means a customer needs to hire a consultant with expert knowledge of VISUALFORCE to change the layout or format of a formatted report document generated from the static templates. On the other hand, for a dynamic templating system, a user can easily modify the layout objects in order to change the layout of the template.

Figure 4:
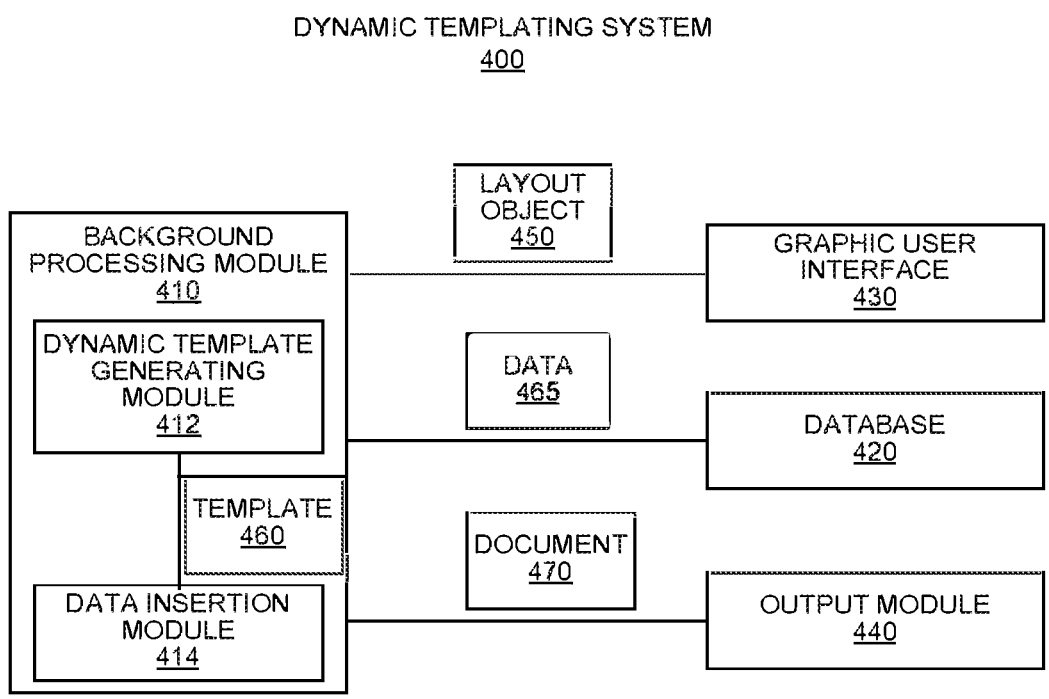
FIG. 4 is a block diagram illustrating components of a dynamic templating system, according to some embodiments of the disclosure.

FIG. 4 illustrates components of a dynamic templating system. The dynamic templating system can be implemented in, e.g., a SALESFORCE application development platform. The dynamic templating system 400 includes a background processing module 410, a database 420, a graphic user interface module 430, an output module 440. The background processing module 410 includes a dynamic template generating module 412 and a data insertion module 414. With the dynamic templating process, a customer can change the data layout (e.g., positioning, font, column order, styling, totals, etc.) by modifying the layout objects of the cloud platform (e.g., SALESFORCE object) via the graphic user interface module 430.

For example, a service provider server 14 can provide a graphic user interface module 430 for users to create or edit layout objects 450. When a user requests to run a report, the dynamic template generating module 412 can generate a dynamic template 460 based on the layout data extracted from the layout objects 450 on the fly. The dynamic template 460 can be a text object and can be generated using a backend process of the cloud platform (e.g., an APEX rendering process). Then the data insertion module 414 inserts actual data 465 from the database 420 into the dynamic template to generate a formatted report document 470 (e.g., an HTML web page or a PDF file). The output module 440 sends out the formatted report document 470 to, e.g., a user device.

Figure 5:
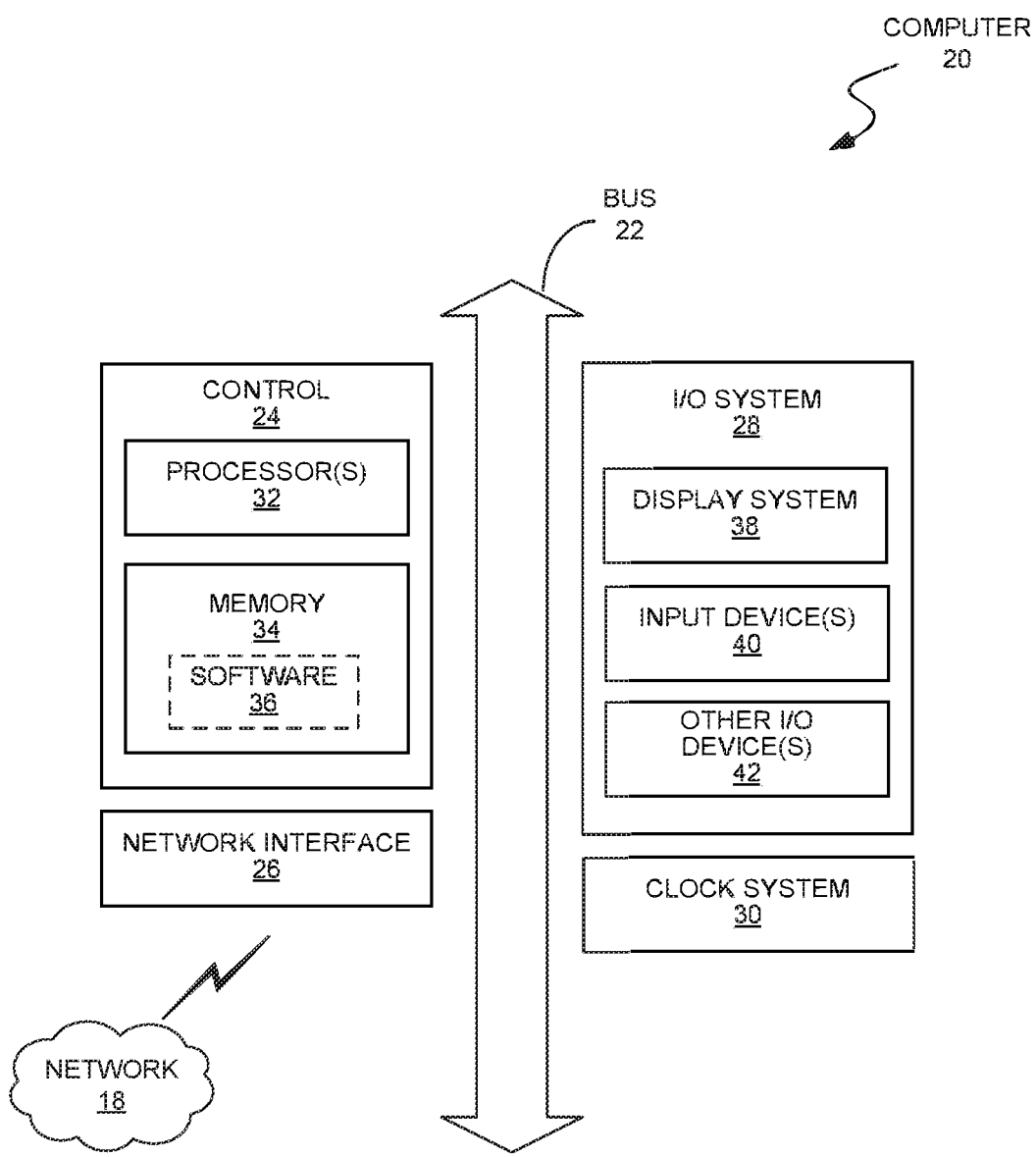
FIG. 5 is a block diagram illustrating a computer operable to implement the disclosed technology according to some embodiments of the present disclosure.

FIG. 5 is a block diagram illustrating a computing device operable to implement the disclosed technology according to some embodiments of the present disclosure. As shown, a computer 20 includes a bus 22 that is operable to transfer data between hardware components. These components include a control 24 (e.g., processing system), a network interface 26, an input/output (I/O) system 28, and a clock system 30. The computer 20 may include other components that are not shown nor further discussed for the sake of brevity. One having ordinary skill in the art will understand any hardware and software that is included but not shown in FIG. 5.

The control 24 includes one or more processor(s) 32 (e.g., central processing units (CPUs), application specific integrated circuits (ASICs), and/or field programmable gate arrays (FPGAs), and memory 34 (which may include software 36). For example, the memory 34 may include volatile memory, such as random-access memory (RAM) and/or non-volatile memory, such as read-only memory (ROM). The memory 34 can be local, remote, or distributed.

A software program (e.g., software 36), when referred to as "implemented in a computer-readable storage medium," includes computer-readable instructions stored in the memory (e.g., memory 34). A processor (e.g., processor(s) 32) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 20), which, when read and executed by at least one processor (e.g., processor(s) 32), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 34).

Network interface 26 may include a modem or other interfaces (not shown) for coupling the computer 20 to other computers over the network 18. The I/O system 28 may operate to control various I/O devices, including peripheral devices such as a display system 38 (e.g., a monitor or touch-sensitive display) and one or more input device(s) 40 (e.g., a keyboard and/or pointing device). Other I/O devices 42 may include, for example, a disk drive, printer, scanner, or the like. Lastly, the clock system 30 controls a timer for use by the disclosed embodiments.

Operation of a memory device (e.g., memory 34), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

What is claimed:

1. A computer-implemented method comprising:
    activating a dynamic templating system implemented in a cloud-based platform in response to a request to generate a report, the cloud-based platform storing a plurality of dynamic templates each of which is pre-rendered to contain tokens at which data items are inserted, the plurality of dynamic templates of the dynamic templating system being rendered across multiple asynchronous processor contexts;
    identifying a table in a base template;
    determining a number of rows to be inserted into the table;
    generating an intermediate template to include the number of rows;

replicating a subset of rows associated with the table in the base template to include in the intermediate template;

inserting a subset of the tokens into the subset of the rows in the intermediate template;

replacing the subset of the tokens with data of tabular datasets; and rendering a report document via a user interface based on a formatted document object based on data in the intermediate template, the data in the intermediate template being populated in the report document in response to other data being sent to the cloud-based platform requesting the data in the intermediate template be populated in the report document, the data in the intermediate template being populated by a data insertion module in data communication with a computer in the cloud-based platform.

2. The method of claim 1, further comprising:

expanding the table of the base template into the intermediate template.

3. The method of claim 2, further comprising:

determining the base template includes another table; and generating another intermediate template to include other rows in the another table.

4. The method of claim 2, further comprising:

expanding the table and another table of the base template in association with multiple intermediate templates.

5. The method of claim 1, further comprising:

generating multiple intermediate template pages to accommodate the number of the rows.

6. The method of claim 1, further comprising:

identifying properties of the base template including a maximum number of rows per page; and determining a number of intermediate template to generate to include the number of rows.

7. The method of claim 1, wherein identifying the table in the base template comprises:

identifying a table component in the base template.

8. The method of claim 7, wherein a token is a tabular token.

9. The method of claim 1, wherein another token is a singular token.

10. The method of claim 9, wherein the singular token includes singular document components including one or more of a label, a title, and non-tabular text data.

11. A system comprising:

a data store configured to store data representing a plurality of dynamic templates, each of which is pre-rendered and configured to store datasets; and a processor configured to execute instructions to implement a dynamic templating system configured to:

activate a dynamic templating system implemented in a cloud-based platform in response to a request to generate a report, the cloud-based platform storing a plurality of dynamic templates each of which is pre-rendered to contain tokens at which data items are inserted the plurality of dynamic templates of the dynamic templating system being rendered across multiple asynchronous processor contexts;

identify a table in a base template;

determine a number of rows to be inserted into the table;

generate an intermediate template to include the number of rows;

replicate a subset of rows associated with the table in the base template to include in the intermediate template;

insert a subset of the tokens into the subset of the rows in the intermediate template;

replace the subset of the tokens with data of tabular datasets; and render a report document via a user interface based on a formatted document object based on data in the intermediate template, the data in the intermediate template being populated in the report document in response to other data being sent to the cloud-based platform requesting the data in the intermediate template be populated in the report document, the data in the intermediate template being populated by a data insertion module in data communication with a computer in the cloud-based platform.

12. The system of claim 11 wherein the processor is further configured to:

expand the table of the base template into the intermediate template.

13. The system of claim 12 wherein the processor is further configured to:

determine the base template includes another table; and generate another intermediate template to include other rows in the another table.

14. The system of claim 12 wherein the processor is further configured to:

expand the table and another table of the base template in association with multiple intermediate templates.

15. The system of claim 11 wherein the processor is further configured to:

generate multiple intermediate template pages to accommodate the number of the rows.

16. The system of claim 11 wherein the processor is further configured to:

identify properties of the base template including a maximum number of rows per page; and determine a number of intermediate template to generate to include the number of rows.

17. The system of claim 11 wherein the processor configured to identify the table in the base template is further configured for identifying a table component in the base template.

18. The system of claim 17 wherein a token is a tabular token.

19. The system of claim 11 wherein another token is a singular token.

20. The system of claim 19 wherein the singular token includes singular document components including one or more of a label, a title, and non-tabular text data.

* * * * *